US011164011B2

(12) United States Patent
Min (10) Patent No.: US 11,164,011 B2
(45) Date of Patent: Nov. 2, 2021

(54) LANE RECOGNITION DEVICE AND METHOD THEREOF

(71) Applicants: HYUNDAI MOTOR COMPANY, Seoul (KR); KIA MOTORS CORPORATION, Seoul (KR)

(72) Inventor: Kyung Deuk Min, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 67 days.

(21) Appl. No.: 16/436,027

(22) Filed: Jun. 10, 2019

(65) Prior Publication Data

US 2020/0234063 A1 Jul. 23, 2020

(30) Foreign Application Priority Data

Jan. 21, 2019 (KR) .................. 10-2019-0007656

(51) Int. Cl.
| | |
|---|---|
| G06K 9/00 | (2006.01) |
| G08G 1/16 | (2006.01) |
| B60W 40/072 | (2012.01) |
| B60W 30/12 | (2020.01) |
| G06T 7/70 | (2017.01) |

(52) U.S. Cl.
CPC ......... *G06K 9/00798* (2013.01); *B60W 30/12* (2013.01); *B60W 40/072* (2013.01); *G06T 7/70* (2017.01); *G08G 1/167* (2013.01); *G06T 2207/30256* (2013.01)

(58) Field of Classification Search
CPC ........... G06K 9/00798; G06K 9/00085; G06K 9/4633; G06K 9/00335; G06K 9/3241; G06K 9/52; B60W 2520/06; B60W 40/072; B60W 40/06; B60W 30/12; B60W 30/10; B60W 2552/30; B60W 2552/53; B60W 2420/42; B60W 2420/52; B60W 2554/4041; B60W 2554/4042; B60R 2300/804; G06T 2207/30256; G06T 2207/10016; G06T 7/70; G01C 21/3658; H04N 1/4092; G08G 1/167
See application file for complete search history.

(56) References Cited

U.S. PATENT DOCUMENTS

| | | | | |
|---|---|---|---|---|
| 5,555,555 A | * | 9/1996 | Sato | G06K 9/00798 382/104 |
| 6,985,619 B1 | * | 1/2006 | Seta | G06K 9/00798 382/154 |
| 8,180,110 B2 | * | 5/2012 | Kageyama | G06K 9/00798 382/104 |
| 8,520,071 B2 | * | 8/2013 | Suzuki | G06K 9/00798 348/148 |
| 10,000,153 B1 | * | 6/2018 | Misu | G06T 11/00 |

(Continued)

FOREIGN PATENT DOCUMENTS

KR 10-1333459 B1 11/2013

*Primary Examiner* — Ian L Lemieux
(74) *Attorney, Agent, or Firm* — Morgan, Lewis & Bockius LLP (57) ABSTRACT

A lane recognition device includes: a camera configured to capture an image in front of a vehicle; and a controller configured to detect a lane from the image in front of the vehicle; generate a plurality of lane equations based on a curved point of the lane; and recognize the lane based on the plurality of lane equations.

16 Claims, 11 Drawing Sheets

(56) References Cited

U.S. PATENT DOCUMENTS

| | | | |
|---|---|---|---|
| 2006/0239509 A1* | 10/2006 | Saito | G06K 9/6205 |
| | | | 382/104 |
| 2009/0138193 A1* | 5/2009 | Katou | G01C 21/3655 |
| | | | 701/533 |
| 2009/0192686 A1* | 7/2009 | Niehsen | G06K 9/3241 |
| | | | 701/70 |
| 2011/0052080 A1* | 3/2011 | Tamura | G06K 9/00798 |
| | | | 382/201 |
| 2012/0212612 A1* | 8/2012 | Imai | B60W 30/12 |
| | | | 348/148 |
| 2013/0272577 A1* | 10/2013 | Sakamoto | G06K 9/00798 |
| | | | 382/103 |
| 2014/0002656 A1* | 1/2014 | Woo | G06K 9/00798 |
| | | | 348/148 |
| 2015/0084988 A1* | 3/2015 | Lee | B60W 40/072 |
| | | | 345/633 |
| 2015/0291215 A1* | 10/2015 | Bajpai | B62D 15/025 |
| | | | 701/41 |
| 2016/0140401 A1* | 5/2016 | Ishigami | G06K 9/00798 |
| | | | 348/148 |
| 2016/0314358 A1* | 10/2016 | Kushida | B60T 8/17557 |
| 2017/0010614 A1* | 1/2017 | Shashua | G08G 1/096725 |
| 2018/0037223 A1* | 2/2018 | Goto | G05D 1/0231 |
| 2018/0046867 A1* | 2/2018 | Yang | G06K 9/6215 |
| 2018/0111613 A1* | 4/2018 | Oh | G05D 1/0219 |
| 2018/0148052 A1* | 5/2018 | Suto | B60W 30/18145 |
| 2018/0273031 A1* | 9/2018 | Fujita | B60W 30/12 |
| 2019/0308621 A1* | 10/2019 | Inou | G08G 1/09 |
| 2020/0122721 A1* | 4/2020 | Zhang | B60W 60/0027 |
| 2020/0189584 A1* | 6/2020 | Nakanishi | B60W 30/095 |
| 2020/0301431 A1* | 9/2020 | Matsubara | B60W 30/00 |

* cited by examiner

LANE RECOGNITION DEVICE AND METHOD THEREOF

CROSS-REFERENCE TO RELATED APPLICATION

This application claims the benefit of priority to Korean Patent Application No. 10-2019-0007656, filed in the Korean Intellectual Property Office on Jan. 21, 2019, the entire contents of which are incorporated herein by reference.

TECHNICAL FIELD

The present disclosure relates to technologies of recognizing lines.

BACKGROUND

As available functions in a vehicle become more advanced, vehicles with various safety systems have been increasing. Various safety systems for vehicles have been developed to detect accidents occurring when driving or parking, by using various sensors, a vision system, and a laser system, so as to warn a driver of the accidents or to control the vehicle. Such safety systems include, for example, an electric stability program (ESP), an adaptive cruise control (ACC), a lane keeping assist system (LKAS), a lane departure warning system (LDWS), and the like.

Currently available safety systems can recognize lines and provide services, such as inter-vehicle distance keeping and lane keeping, based on the recognized lines.

For instance, a conventional lane recognition technology is developed for capturing an image in front of a vehicle by means of a camera loaded into the vehicle, detecting a line from the captured image in front of the vehicle, performing curve fitting of a set of location coordinates (x, y) of the detected line to approximate the set of the location coordinates (x, y) to a cubic equation of the line, and recognizing the line based on the cubic equation. The cubic equation of the approximated line is Equation 1 below.

$$y = c_3 x^3 + c_2 x^2 + c_1 x + c_0 \quad \text{[Equation 1]}$$

Here, $C_0$ denotes the lateral offset of the line, $C_1$ denotes the heading angle slope of the line, $C_2$ denotes the curvature of the line, and $C_3$ denotes the curvature rate of the line. The lateral offset of the line is a parameter indicating how far the line is located from the center of the vehicle, and the heading angle slope of the line is a parameter indicating a slope between the line and a progress direction of the vehicle.

Such a conventional lane recognition technology represents a real line as a cubic equation of the line without considering a case where the line on the road is curved to form a certain angle without being bent in the form of a smooth curve (e.g., a line in a form where two straight lines from one point form the certain angle). Such that an error between the real line and the cubic equation of the line (the recognized line) is increased, and thus, the driving safety is not ensured by the conventional technology.

SUMMARY

The present disclosure has been made to solve the above-mentioned problems occurring in the prior art while advantages achieved by the prior art are maintained intact.

An aspect of the present disclosure provides a lane recognition device for recognizing a line with high accuracy when a line on the road is curved to form a certain angle without being bent in the form of a smooth curve (e.g., in case of a line in a form where two straight lines from one point form the certain angle), by representing the line as a plurality of cubic equations in consideration of a form of the line drawn on the road and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lane recognition device may include: a camera configured to capture an image in front of a vehicle; and a controller configured to recognize a line based on a curved point of the line obtained from the image in front of the vehicle.

The controller may be configured to detect the line from the image in front of the vehicle, the image being captured by the camera, generate a plurality of line equations on the basis of the curved point of the line, and recognize the line on a road based on the plurality of line equations.

The controller may be configured to convert the detected line from a camera coordinate system to a road coordinate system.

The controller may be configured to detect the line in a setting interval of a minimum point to a maximum point in the image in front of the vehicle, approximate the detected line to a line equation, and detect the curved point, when an error between the line and the line equation is greater than a first threshold. The error may be an area formed by the line and the line equation.

The controller may be configured to generate a first error graph between the line and the line equation in a process of performing curve fitting of a line set configuring the detected line in ascending order of x values, generate a second error graph between the line and the line equation in a process of performing curve fitting of the line set in descending order of the x values, and set a point where the first error graph and the second error graph are met as the curved point.

The controller may be configured to generate a first line equation by performing curve fitting of a line set in an interval of the minimum point to the curved point in the ascending order of the x values and generate a second line equation by performing curve fitting of a line set in an interval of the maximum point to the curved point in the descending order of the x values.

The lane recognition device may further include a radar configured to detect a location and a relative speed of a preceding vehicle. The controller may be configured to calculate a driving trajectory based on the location and the relative speed of the preceding vehicle, perform curve fitting of a set configuring the calculated driving trajectory, and reduce the first threshold, when a curvature rate of the driving trajectory is greater than a second threshold.

The lane recognition device may further include a communicator configured to obtain a driving trajectory of a road where the vehicle is currently traveling from a driving trajectory server. The controller may be configured to perform curve fitting of a set configuring the driving trajectory obtained via the communicator and reduce the first threshold, when a curvature rate of the driving trajectory is greater than a second threshold.

According to another aspect of the present disclosure, a lane recognition method may include: capturing, by a camera of a vehicle, an image in front of the vehicle; and recognizing, by a controller of the vehicle, a line based on a curved point of the line obtained from the image in front of the vehicle.

The recognizing of the line may include detecting the line from the image in front of the vehicle, generating a plurality of line equations on the basis of the curved point of the line, and recognizing the line on a road based on the plurality of line equations. The detecting of the line may include converting the detected line from a camera coordinate system to a road coordinate system.

The calculating of the plurality of equations may include detecting the line in a setting interval of a minimum point to a maximum point in the image in front of the vehicle, approximating the detected line to a line equation, and detecting the curved point, when an error between the line and the line equation is greater than a first threshold. It is preferable that the error is an area formed by the line and the line equation.

The detecting of the curved point may include generating a first error graph between the line and the line equation in a process of performing curve fitting of a line set configuring the detected line in ascending order of x values, generating a second error graph between the line and the line equation in a process of performing curve fitting of the line set in descending order of the x values, and setting a point where the first error graph and the second error graph are met as the curved point.

The calculating of the plurality of line equations may include generating a first line equation by performing curve fitting of a line set in an interval of the minimum point to the curved point in the ascending order of the x values and generating a second line equation by performing curve fitting of a line set in an interval of the maximum point to the curved point in the descending order of the x values.

The calculating of the plurality of equations may include calculating a driving trajectory based on a location and a relative speed of a preceding vehicle, performing curve fitting of a set configuring the calculated driving trajectory, and reducing the first threshold, when a curvature rate of the driving trajectory is greater than a second threshold.

The calculating of the plurality of equations may include obtaining a driving trajectory of a road where the vehicle is currently traveling from a driving trajectory server, performing curve fitting of a set configuring the driving trajectory, and reducing the first threshold, when a curvature rate of the driving trajectory is greater than a second threshold.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
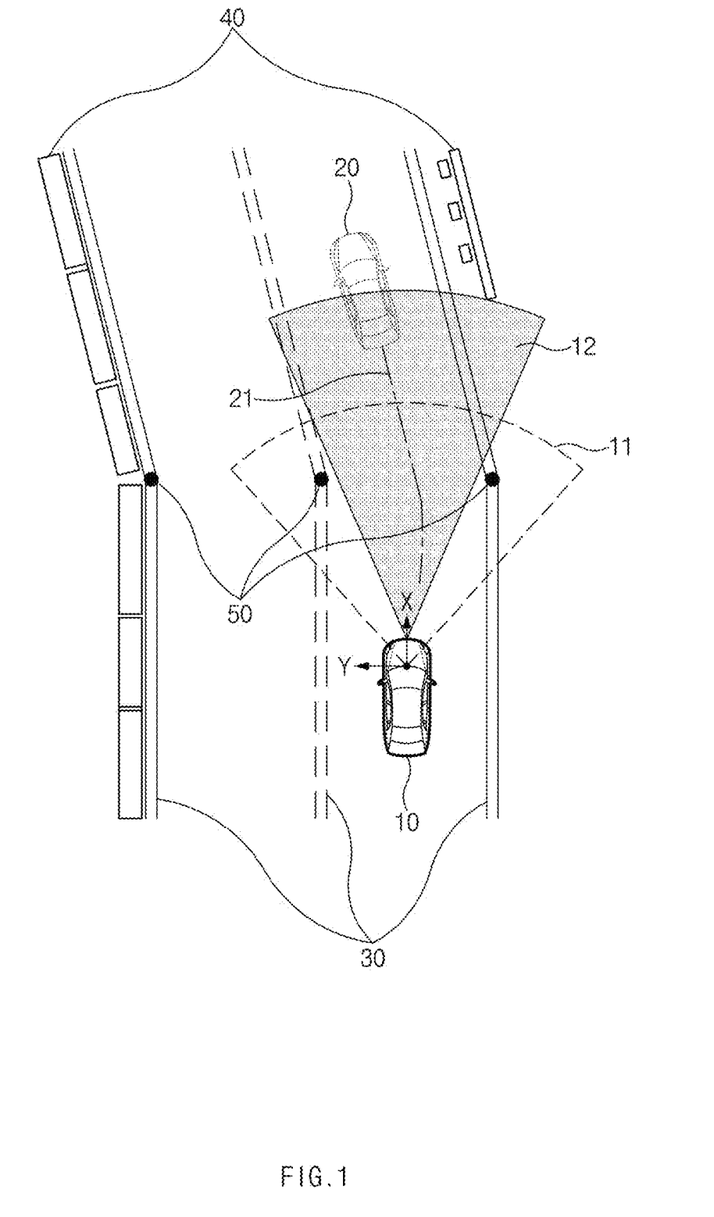
FIG. 1 is a drawing illustrating an environment of a road where a vehicle to which an exemplary embodiment of the present disclosure is applied is traveling.

FIG. 1 is a drawing illustrating an environment of a road where a vehicle to which an exemplary embodiment of the present disclosure is applied is traveling.

FIG. 1 illustrates that a host vehicle 10 is traveling on the road, and a preceding vehicle 20 is traveling in front of the host vehicle 20.

A line 30 may not be bent in a smooth curve but is curved at a certain angle at point 50. In other words, the line 30 may have a form where two straight lines form a certain angle on the basis of the division point 50. For reference, there is a limitation that a cubic equation accurately expresses such a line 30.

In FIG. 1, reference numeral 40 indicates a guardrail, a median strip, and the like as road structures, reference numeral 11 indicates an image capture region of a camera loaded into the host vehicle 10, reference numeral 12 indicates a detection region of a front radar loaded into the host vehicle 10, and reference numeral 21 indicates a driving trajectory of the preceding vehicle 20.

Furthermore, a coordinate system (x, y) displayed on the host vehicle 10 is a coordinate system of the camera loaded into the host vehicle 10 and is a criterion of indicating locations of objects in an image in front of the host vehicle 10, captured by the camera. Herein, x denotes a longitudinal direction of the host vehicle 10, and y denotes a lateral direction of the host vehicle 10.

Figure 2:
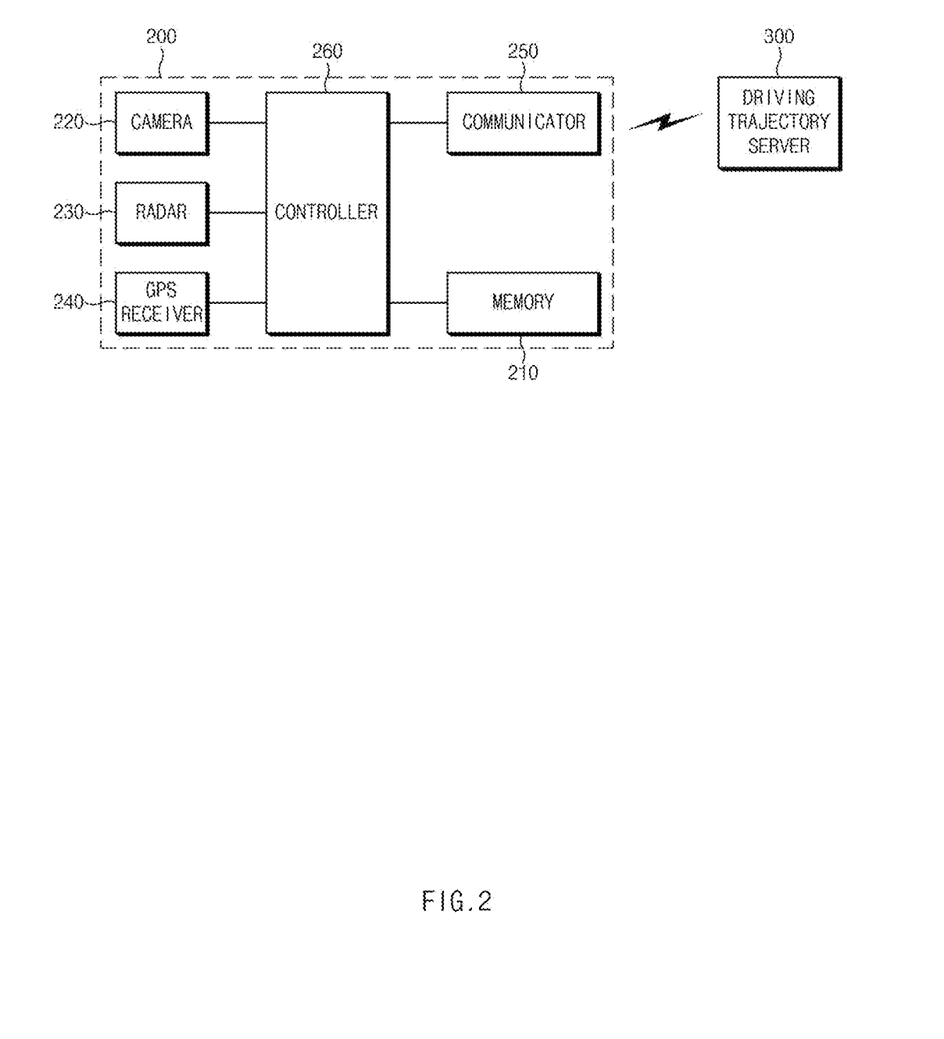
FIG. 2 is a block diagram illustrating a configuration of a lane recognition device according to an exemplary embodiment of the present disclosure.

FIG. 2 is a block diagram illustrating a configuration of a lane recognition device according to an exemplary embodiment of the present disclosure.

As shown in FIG. 2, a lane recognition device 200 according to an exemplary embodiment of the present disclosure may include a memory 210, a camera 220, a radar 230, a global positioning system (GPS) receiver 240, a communicator (e.g., a transceiver) 250, a controller 260, and the like. The respective components may be combined with each other to form one component depending on a manner which executes the lane recognition device according to an exemplary embodiment of the present disclosure, and some components may be omitted according to a manner which executes an exemplary embodiment of the present disclosure.

Seeing the respective components, the memory 210 may store various logics, algorithms, and programs necessary to represent a line as a plurality of cubic equations in consideration of a form of the line drawn on a road.

Furthermore, the memory 210 may store a curve fitting technique which approximates a real line to a cubic equation based on a least square method or the like.

Such a memory 210 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

Figure 4:
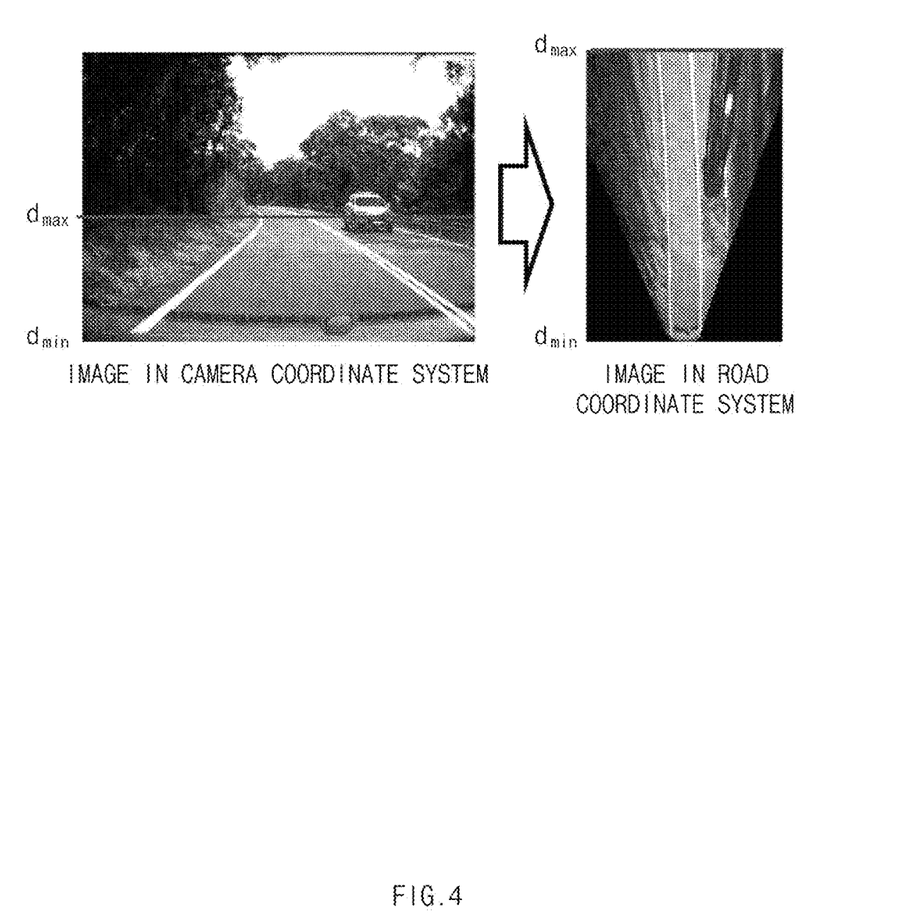
FIG. 4 is a drawing illustrating a result of converting an image in a camera coordinate system into an image in a road coordinate system in a lane recognition device according to an exemplary embodiment of the present disclosure.

The camera 220 may be a module, loaded into a vehicle, for capturing an image in front of the vehicle, and may have an image capture range corresponding to reference numeral 11 shown in FIG. 1. For example, the image in front of the vehicle, captured by the camera 220, is shown in FIG. 4.

The radar 230 may be a module, loaded into the vehicle, for detecting an area in front of the vehicle, and may have a detection area corresponding to reference numeral 12 shown in FIG. 1. Such a radar 230 may detect a location and a relative speed of a preceding vehicle 20 of FIG. 1 and may detect a location of a structure on a road.

In addition, the radar 230 may play a role in assisting the camera 220. In other words, data obtained by the radar 230 may be used additionally when detecting a line from the image in front of the vehicle, captured by the camera 220.

The GPS receiver 240 may be a module for receiving location information (coordinates) from a GPS satellite and may be used to identify a current location of a host vehicle 10 of FIG. 1.

The communicator 250 may be a module for providing a communication interface with a driving trajectory server 300 and may obtain a driving trajectory for a road where the host vehicle 10 is traveling from the driving trajectory server 300. In this case, the driving trajectory may be a driving trajectory of a vehicle which previously traveled on the road, or may be an optimal driving trajectory derived from driving trajectories (a plurality of driving trajectories) of vehicles which previously traveled on the road. For example, the optimal driving trajectory may be derived from a movement average of the vehicles which previously traveled on the road.

Such a communicator 250 may have a mobile communication module, a wireless Internet module, and a short-range communication module.

Herein, the mobile communication module may transmit and receive a wireless signal with the driving trajectory server 300 over a mobile communication network which is established according to a technical standard or a communication mode for mobile communication (e.g., global system for mobile communication (GSM), code division multiple access (CDMA), code division multiple access 200 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), LTE-advanced (LTE-A), or the like). The wireless signal may include a voice call signal, a video call signal, or data in various forms according to transmission and reception of a text/multimedia message.

The wireless Internet module may be configured to transmit and receive a wireless signal on a communication network according to wireless Internet technology. The wireless Internet technology may be, for example, wireless local area network (WLAN), wireless-fidelity (Wi-Fi), Wi-Fi Direct, digital living network alliance (DLNA), wireless broadband (WiBro), world interoperability for microwave access (WiMAX), high speed downlink packet access (HSDPA), high speed uplink packet access (HSUPA), long term evolution (LTE), LTE-advanced (LTE-A), or the like.

The short-range communication module may be for short-range communication and may support the short-range communication using at least one of Bluetooth™, radio frequency identification (RFID), infrared data association (IrDA), ultra wideband (UWB), ZigBee, near field communication (NFC), Wi-Fi, Wi-Fi Direct, and wireless universal serial bus (USB) technologies.

The controller 260 may perform overall control such that the respective components normally perform their own functions. Such a controller 260 may be implemented in the form of hardware or software or in the form of a combination thereof. The controller 260 may be implemented as, but not limited to, a microprocessor, or may be an electronic control unit (ECU).

Such a controller 260 may approximate a line to a plurality of cubic equations in consideration of the line drawn on a road and may perform a variety of control necessary to perform the process of recognizing the line on the road based on the approximated cubic equations.

Hereinafter, a description will be given in detail of an operation of the controller 260 with reference to FIGS. 3, 4, 5A-5D, and 6.

Figure 3:
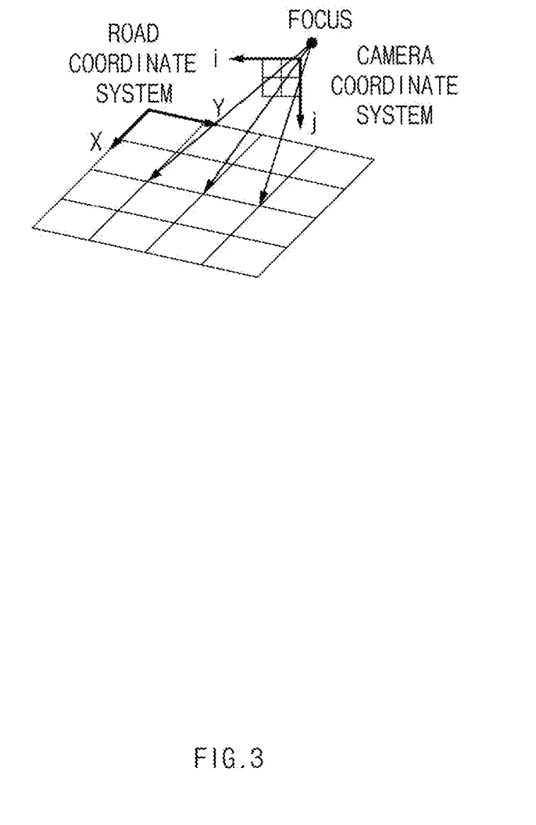
FIG. 3 is a drawing illustrating a process of converting a camera coordinate system into a road coordinate system in a lane recognition device according to an exemplary embodiment of the present disclosure.

FIG. 3 is a drawing illustrating a process of converting a camera coordinate system into a road coordinate system in a lane recognition device according to an exemplary embodiment of the present disclosure.

The controller 260 may detect a line from an image in front of a vehicle, captured by the camera 220. The detected line may be represented as a set of a camera coordinate system (i, j).

Thereafter, the controller 260 may convert the line set represented as the camera coordinate system into a road coordinate system (x, y).

As shown in FIG. 3, the controller 260 may convert the camera coordinate system (i, j) into the road coordinate system (x, y) on the basis of a focus. In other words, the controller 260 may perform a conversion process based on Equation 2 below.

$$y(i,j) = X(j) \times \tan^{-1}(A_p \times (i - C_h)) \qquad \text{[Equation 2]}$$

Here, x denotes the x coordinate value of the road, y denotes the y coordinate value of the road, $C_h$ denotes the horizontal vanishing point of the camera, i denotes the horizontal pixel of the camera, j denotes the vertical pixel of the camera, and $A_p$ denotes the angle of view per one pixel. In this case, $A_p$ satisfies Equation 3 below, and $X(j)$ satisfies Equation 4 below.

$$A_p = \frac{F_h}{P_h} = \frac{F_v}{P_v} \qquad \text{[Equation 3]}$$

Here, $F_h$ denotes the horizontal angle of view, $F_v$ denotes the vertical angle of view, $P_h$ denotes the horizontal resolution, and $P_v$ denotes the vertical resolution.

$$x(j) = \frac{H_c}{\tan(A_p \times (j - C_v))} \qquad \text{[Equation 4]}$$

Here, $H_c$ denotes the height of the camera, and $C_v$ denote the vertical vanishing point the camera.

FIG. 4 is a drawing illustrating a result of converting an image in a camera coordinate system into an image in a road coordinate system in a lane recognition device according to an exemplary embodiment of the present disclosure.

The controller 260 may convert an image in a camera coordinate system into an image in a road coordinate system based on Equation 2 above. In this case, because a line is included in the image in the camera coordinate system, the line in the camera coordinate system may be converted into a line in the road coordinate system in the conversion process. The controller 260 may detect the line from the image in the camera coordinate system and may convert only the detected line into a line in the road coordinate system, without converting the entire image into an image in the road coordinate system.

Thereafter, the controller 260 may perform a process of determining whether a curved point 50 of FIG. 1 is located on a line 30 of FIG. 2, represented as the road coordinate system.

FIGS. 5A to 5D are drawings illustrating a process of detecting a curved point on a line in a lane recognition device according to an exemplary embodiment of the present disclosure. FIG. 6 is a drawing illustrating a plurality of line equations generated by a lane recognition device according to an exemplary embodiment of the present disclosure.

Figure 5A:
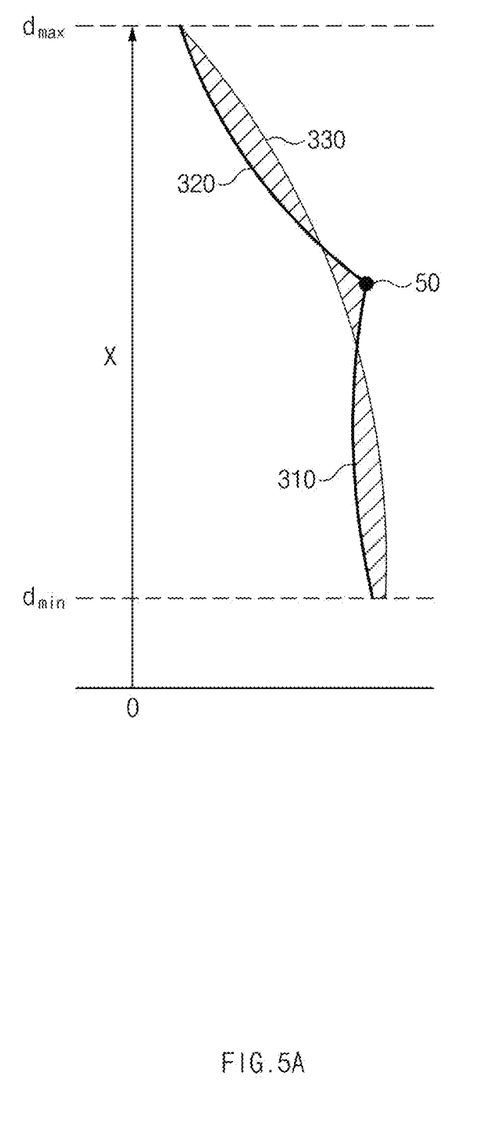
FIGS. 5A, 5B, 5C, and 5D are drawings illustrating a process of detecting a curved point on a line in a lane recognition device according to an exemplary embodiment of the present disclosure.
Figure 6:
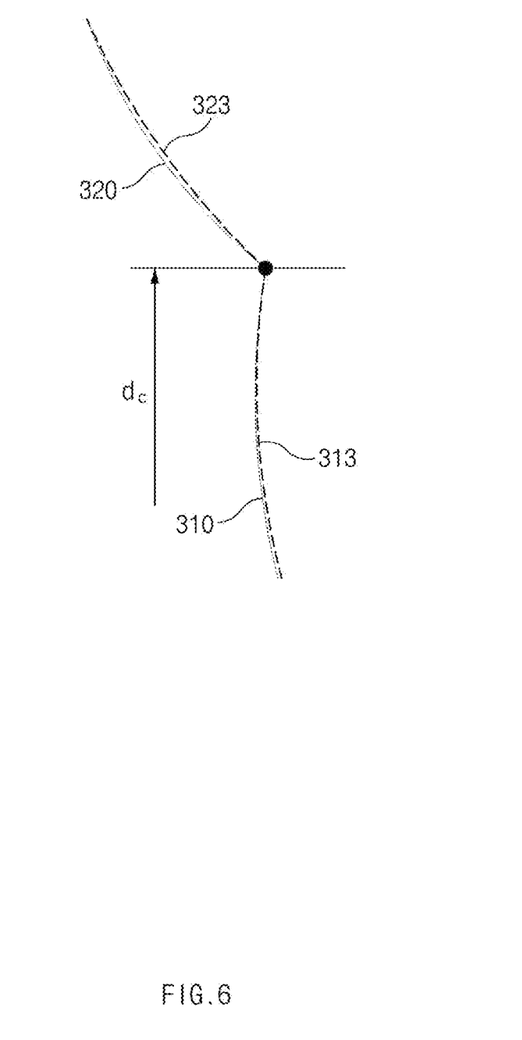
FIG. 6 is a drawing illustrating a plurality of line equations generated by a lane recognition device according to an exemplary embodiment of the present disclosure.

To determine whether to detect a curved point on a line, as shown in FIG. 5A, a controller 260 of FIG. 2 may perform a process of detecting the entire error $E_a$. In other words, the controller 260 may approximate real lines 310 and 320 to a cubic equation 330 of the line in a setting interval of $d_{min}$ to $d_{max}$ without considering a curved point 50. Herein, $d_{min}$ denotes a distance closest to the host vehicle 10 of FIG. 1, and $d_{max}$ denotes a distance most distant from the host vehicle 10.

When approximating the real lines 310 and 320 to the cubic equation 330 of the line for the setting interval, when the error $E_a$ between the cubic equation 330 of the line and the real lines 310 and 330 is greater than a threshold $E_{th}$, the controller 260 may determine that there is the curved point 50 to perform a process of detecting the curved point 50. In this case, a size of the error may be represented as a size of an area formed by the real lines 310 and 320 and the cubic equation 330 of the lane.

Figure 5B:
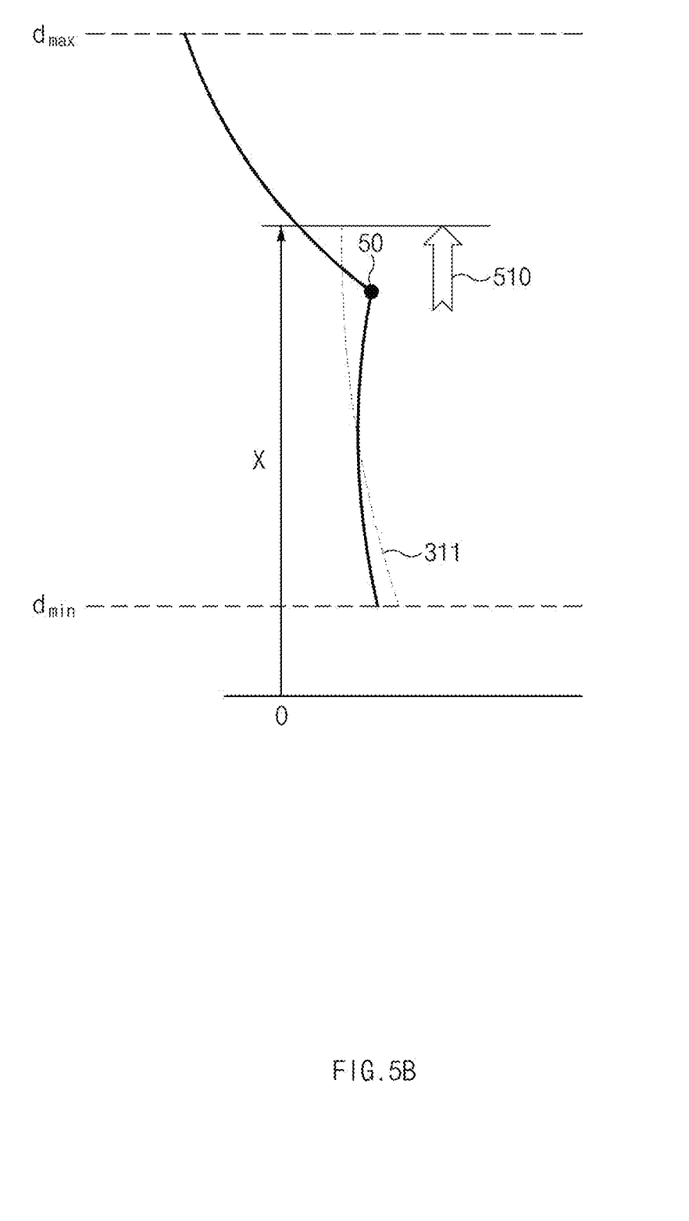

Thereafter, as shown in FIG. 5B, the controller 260 may perform a process (curve fitting) of approximating a line set detected from the real lines 310 and 320 to the cubic equation in the direction (arrow) of point $d_{max}$ from point $d_{min}$. In this process, the controller 260 may calculate a first error $E_b$ on a periodic basis.

Figure 5C:
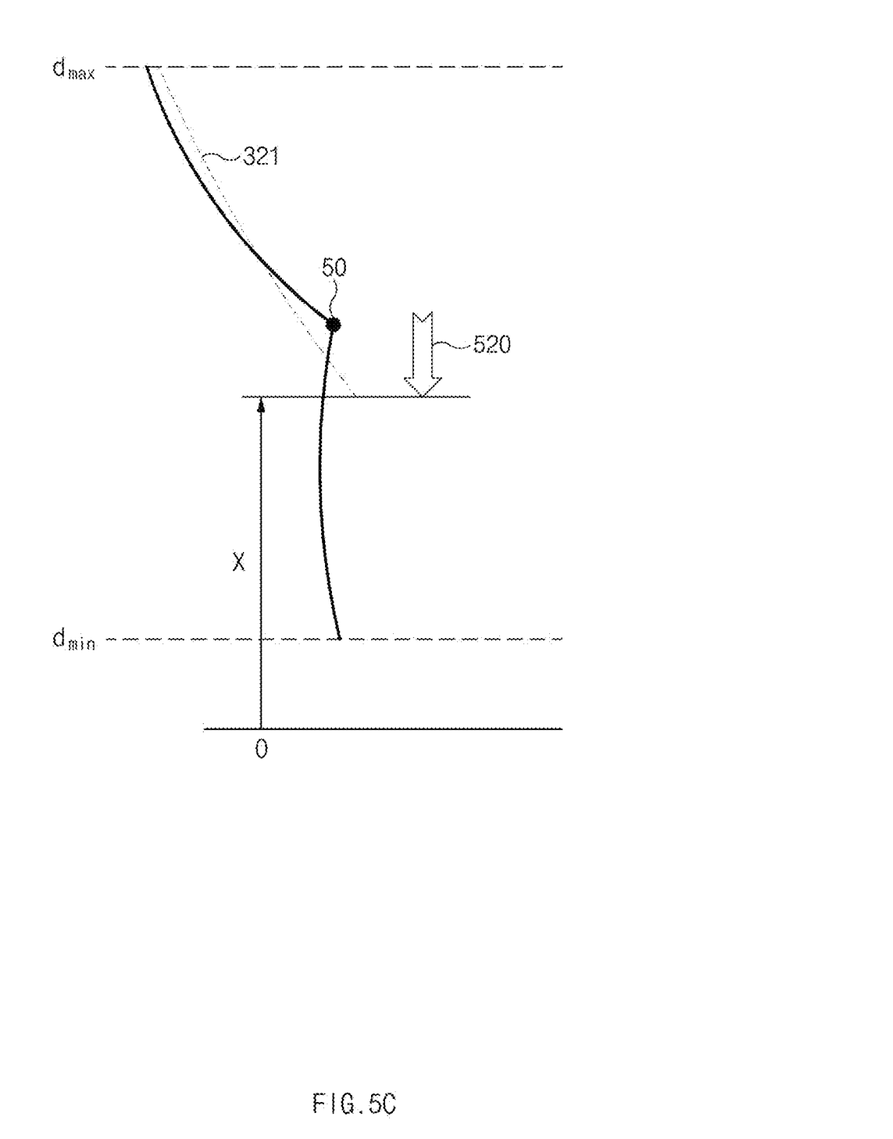

Furthermore, as shown in FIG. 5C, the controller 260 may perform a process (curve fitting) of approximating the line set detected from the real lines 310 and 320 to the cubic equation in the direction (arrow) of point $d_{min}$ from point $d_{max}$. In this process, the controller 260 may calculate a second error $E_c$ on a periodic basis.

Figure 5D:
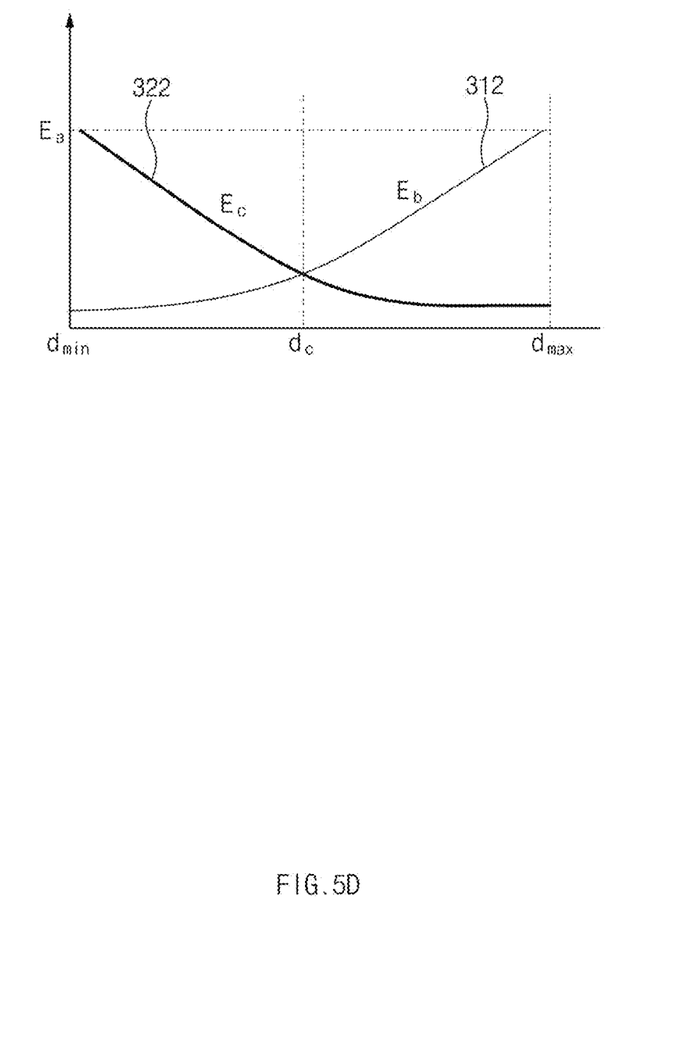

Thereafter, as shown in FIG. 5D, the controller 260 may represent the first error $E_b$ and the second error $E_c$, which are calculated on a periodic basis, as graphs.

The controller 260 may detect a point $d_c$ at which a first error graph and a second error graph are met as the curved point 50.

Thereafter, the controller 260, as shown in FIG. 5D, may approximate the line set 310 to the cubic equation of the line in an arrow direction 510 in an interval of $d_{min}$ to $d_c$ 50 and, as shown in FIG. 5C, may approximate the line set 320 to the cubic equation of the line in an arrow direction 520 to, as shown in FIG. 6, generate the cubic equation 313 of the line corresponding to the line set 310 and a cubic equation 323 of the line corresponding to the line set 320 on the basis of the curved point $d_c$.

Comparing FIG. 5A with FIG. 6, it may be seen that the cubic equations 313 and 323 of the line shown in FIG. 6 are more similar to the real lines 310 and 320.

The controller 260 may detect a driving trajectory 21 of a preceding vehicle 20 of FIG. 1 based on an image in front of the vehicle, captured by a camera 220 of FIG. 2, and a result of detection at a radar 230 of FIG. 2. Because the process of detecting such a driving trajectory is the technology which is well-known or commonly used, a detailed description thereof will be omitted.

Thereafter, the controller 260 may perform approximation (curve fitting) of the driving trajectory 21 of the preceding vehicle 20 to the cubic equation. The approximated cubic equation may be Equation 5 below.

$$y = p_3 x^3 + p_2 x^2 + p_1 x + p_0 \qquad \text{[Equation 5]}$$

Here, $P_0$ denotes the lateral offset of the driving trajectory, $P_1$ denotes the heading angle slope of the driving trajectory, $P_2$ denotes the curvature of the driving trajectory, and $P_3$ denotes the curvature rate of the trajectory.

Thereafter, when $P_3$ is greater than a threshold $E_{th}$, the controller 260 may multiply the threshold $E_{th}$ by a weight w to set the threshold $E_{th}$ to a smaller value. In this case, it is preferable that the weight w is a value between 0 and 1.

Meanwhile, the controller 260 may obtain a driving trajectory of a road where the vehicle is currently traveling, obtained from a driving trajectory server 300 of FIG. 2 via a communicator 250 of FIG. 2 and may set the threshold $E_{th}$ based on the obtained driving trajectory. In this case, the driving trajectory obtained from the driving trajectory server 300 may include information about coordinates (x, y).

Figure 7:
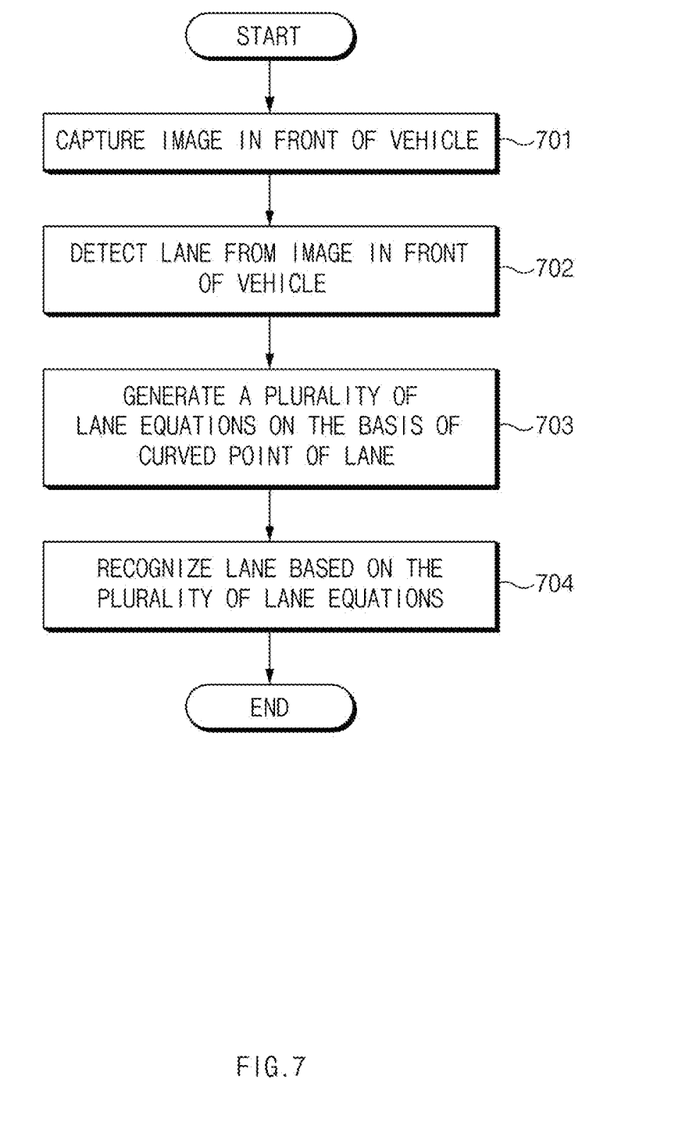
FIG. 7 is a flowchart illustrating a lane recognition method according to an exemplary embodiment of the present disclosure.

FIG. 7 is a flowchart illustrating a lane recognition method according to an exemplary embodiment of the present disclosure.

In operation 701, a camera 220 of FIG. 2 may capture an image in front of a vehicle.

In operation 702, a controller 260 of FIG. 2 may detect a line from the image in front of the vehicle. In other words, the controller 260 may detects the line from the image in front of the vehicle, may generate a first error graph between the line and a line equation in a process of performing curve fitting of a line set (x, y) configuring the detected line in ascending order of x values, may generate a second error graph between the line and the line equation in a process of performing curve fitting of the line set in descending order of the x values, and may set a point at which the first error graph and the second graph are met as a curved point $d_c$.

In operation 703, the controller 260 may generate a plurality of line equations on the basis of the curved point of the line. In other words, the controller 260 may perform curve fitting of the line set (x, y) in an interval of $d_{min}$ to $d_c$ in the ascending order of the x values to generate a first line equation and may perform curve fitting of the line set (x, y) in an interval of $d_{max}$ to $d_c$ in the descending order of the x values to generate a second line equation.

In operation 704, the controller 260 may recognize the line on a road based on the plurality of line equations.

Figure 8:
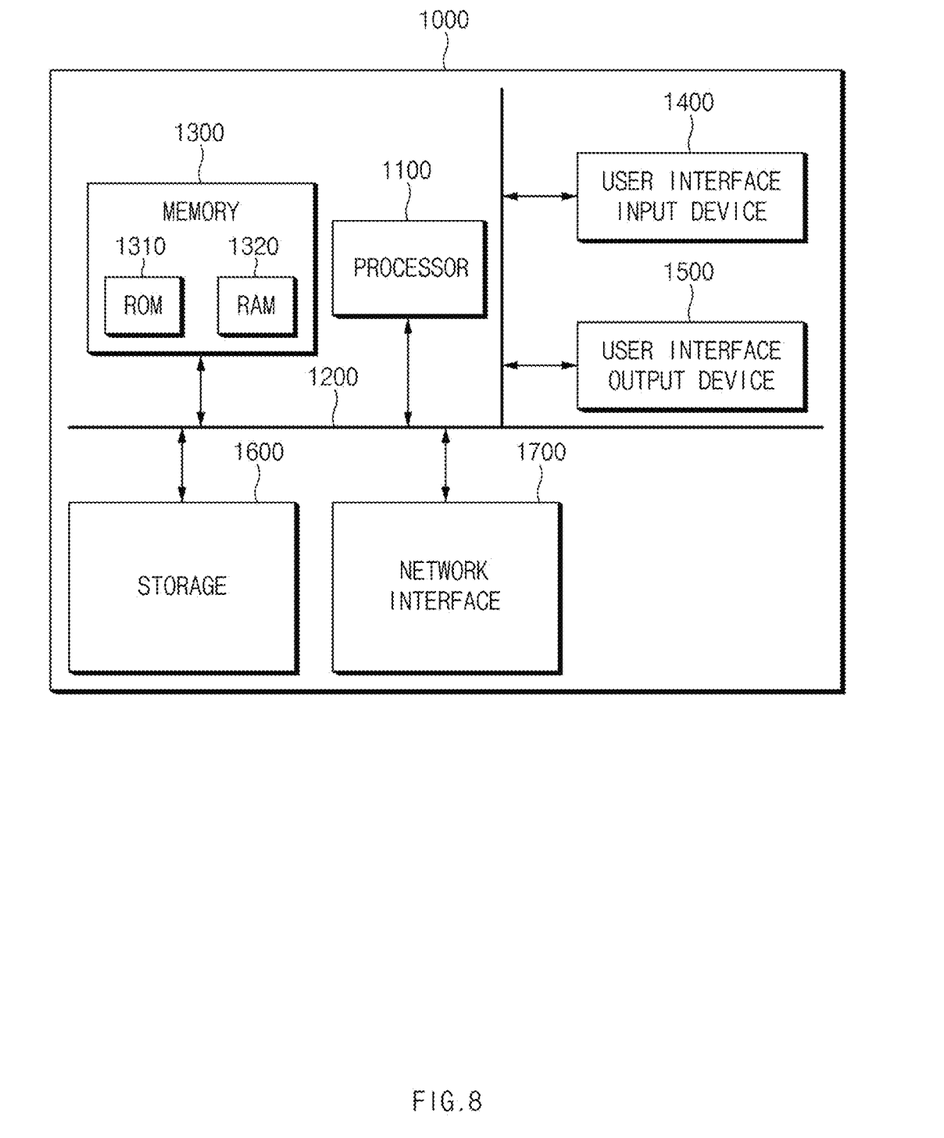
FIG. 8 is a block diagram illustrating a computing system for executing a lane recognition method according to an exemplary embodiment of the present disclosure.

FIG. 8 is a block diagram illustrating a computing system for executing a lane recognition method according to an exemplary embodiment of the present disclosure.

Referring to FIG. 8, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The lane recognition device and the method thereof according to an exemplary embodiment of the present disclosure may recognize the line with high accuracy when the line on the road is curved to form a certain angle without being bent in the form of a smooth curve (e.g., in case of a line in a form where two straight lines from one point form the certain angle), by representing the line as a plurality of cubic equations in consideration of a form of the line drawn on the road.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A lane recognition device, comprising:
   a camera configured to capture an image in front of a vehicle; and
   a controller configured to recognize a line based on a curved point of the line obtained from the image in front of the vehicle,
   wherein the line is bent at a certain angle at the curved point without being smoothly bent, or the line is bent at the certain angle and includes discontinuous sections, and
   wherein the certain angle includes at least one of an acute angle, an obtuse angle, or a right angle,
   wherein the controller is configured to:
   detect the line in a setting interval of a minimum distance closest to the vehicle to a maximum distance most distant from the vehicle in the image in front of the vehicle,
   approximate the detected line to a line equation,
   detect the curved point, when an error between the line and the line equation is greater than a first threshold,
   generate one or more line equations based on the curved point of the line, and
   recognize the line on a road based on the one or more line equations.

2. The lane recognition device of claim 1, wherein the controller is further configured to convert the detected line from a camera coordinate system to a road coordinate system.

3. The lane recognition device of claim 1, wherein the error is formed by the line and the line equation.

4. The lane recognition device of claim 1, wherein the controller is further configured to:
   generate a first error graph between the line and the line equation in a process of performing curve fitting of a line set configuring the line in ascending order of x values,
   generate a second error graph between the line and the line equation in a process of performing curve fitting of the line set in descending order of the x values, and
   set a point where the first error graph and the second error graph are met as the curved point.

5. The lane recognition device of claim 4, wherein the controller is further configured to:
   generate a first line equation by performing curve fitting of a line set in an interval of the minimum distance to the curved point in the ascending order of the x values, and
   generate a second line equation by performing curve fitting of a line set in an interval of the maximum distance to the curved point in the descending order of the x values.

6. The lane recognition device of claim 5, wherein the controller is configured to recognize the line based on the first line equation and the second line equation.

7. The lane recognition device of claim 1, further comprising a radar configured to detect a location and a relative speed of a preceding vehicle which is located in front of the vehicle.

8. The lane recognition device of claim 7, wherein the controller is further configured to:
   calculate a driving trajectory based on the location and the relative speed of the preceding vehicle, perform curve fitting of a set configuring the driving trajectory; and reduce the first threshold, when a curvature rate of the driving trajectory is greater than a second threshold.

9. The lane recognition device of claim 1, further comprising a communicator configured to obtain a driving trajectory of the road on which the vehicle is currently traveling from a driving trajectory server.

10. The lane recognition device of claim 9, wherein the controller is configured to:

perform curve fitting of a set configuring the driving trajectory obtained via the communicator, and reduce the first threshold, when a curvature rate of the driving trajectory is greater than a second threshold.

11. A lane recognition method, comprising:

capturing, by a camera of a vehicle; an image in front of the vehicle; and recognizing, a controller of the vehicle, a line based on a curved point of the line obtained from the image in front of the vehicle, wherein the line is bent at a certain angle at the curved point without being smoothly bent, or the line is bent at the certain angle and includes discontinuous sections, and wherein the certain angle includes at least one of an acute angle, an obtuse angle, or a right angle, wherein the recognizing of the line includes:

detecting the line in a setting interval of a minimum distance closest to the vehicle to a maximum distance most distant from the vehicle in the image in front of the vehicle;

approximating the line to a line equation;

detecting the curved point, when an error between the line and the line equation is greater than a first threshold;

generating one or more line equations based on the curved point of the line; and recognizing the line on a road based on the one or more line equations.

12. The lane recognition method of claim 11, wherein the detecting of the line includes converting the detected line from a camera coordinate system to a road coordinate system.

13. The lane recognition method of claim 11, wherein the detecting of the curved point includes:

generating a first error graph between the line and the line equation in a process of performing curve fitting of a line set configuring the detected line in ascending order of x values;

generating a second error graph between the line and the line equation in a process of performing curve fitting of the line set in descending order of the x values; and setting a point where the first error graph and the second error graph are met as the curved point.

14. The lane recognition method of claim 13, wherein the generating the one or more line equations includes:

generating a first line equation by performing curve fitting of a line set in an interval of the minimum distance to the curved point in the ascending order of the x values; and generating a second line equation by performing curve fitting of a line set in an interval of the maximum distance to the curved point in the descending order of the x values.

15. The lane recognition method of claim 11, wherein the generating the one or more line equations further includes:

calculating a driving trajectory based on a location and a relative speed of a preceding vehicle;

performing curve fitting of a set configuring the driving trajectory; and reducing the first threshold, when a curvature rate of the driving trajectory is greater than a second threshold.

16. The lane recognition device of claim 11, wherein the generating the one or more line equations further includes:

obtaining a driving trajectory of the road on which the vehicle is currently traveling from a driving trajectory server;

performing curve fitting of a set configuring the driving trajectory; and reducing the first threshold, when a curvature rate of the driving trajectory is greater than a second threshold.

* * * * *